United States Patent
Vorspel

(10) Patent No.: US 10,252,929 B2
(45) Date of Patent: Apr. 9, 2019

(54) DEVICE FOR MANUFACTURING HOLLOW GLASS ARTICLES

(71) Applicant: Heye International GmbH, Obernkirchen (DE)

(72) Inventor: Bernard Vorspel, Breda (NL)

(73) Assignee: HEYE INTERNATIONAL GmbH, Obernkirchen (DE)

(*) Notice: Subject to any disclaimer, the term of this patent is extended or adjusted under 35 U.S.C. 154(b) by 21 days.

(21) Appl. No.: 15/400,243

(22) Filed: Jan. 6, 2017

(65) Prior Publication Data

US 2017/0197860 A1    Jul. 13, 2017

(30) Foreign Application Priority Data

Jan. 8, 2016    (DE) .................. 10 2016 000 125

(51) Int. Cl.

| | |
|---|---|
| *C03B 9/13* | (2006.01) |
| *C03B 40/027* | (2006.01) |
| *C03B 9/40* | (2006.01) |
| *C03B 9/16* | (2006.01) |
| *C03B 9/193* | (2006.01) |
| *C03B 9/41* | (2006.01) |
| *C03B 11/16* | (2006.01) |

(52) U.S. Cl.
CPC .................. *C03B 9/13* (2013.01); *C03B 9/16* (2013.01); *C03B 9/193* (2013.01); *C03B 9/40* (2013.01); *C03B 9/41* (2013.01); *C03B 11/16* (2013.01); *C03B 40/027* (2013.01)

(58) Field of Classification Search
CPC ............ C03B 40/027; C03B 9/13; C03B 9/40
See application file for complete search history.

(56) References Cited

U.S. PATENT DOCUMENTS

| 3,814,594 A | 6/1974 | Mumford | |
|---|---|---|---|
| 4,409,010 A * | 10/1983 | Brown | .................. C03B 40/027 65/170 |
| 4,990,171 A | 2/1991 | Kojima et al. | |
| 5,785,727 A | 7/1998 | Mine et al. | |
| 8,375,743 B2 | 2/2013 | Zanella et al. | |
| 2011/0296874 A1 * | 12/2011 | Ghione | ..................... C03B 9/16 65/26 |

(Continued)

FOREIGN PATENT DOCUMENTS

| DE | 602005002072 T2 | 5/2008 |
|---|---|---|
| EP | 0372530 B1 | 6/1990 |

(Continued)

*Primary Examiner* — Queenie S Dehghan
(74) *Attorney, Agent, or Firm* — Fox Rothschild LLP

(57) ABSTRACT

A device for manufacturing hollow glass article consists of a plurality of modular stations that, among other things, comprise blank molds and finish molds, wherein a housing is provided and can be displaced along a blank mold side in order to carry out at least control and servicing functions, and wherein said housing is formed by a key-like structure that is open in the direction of the blank mold side and serves as a carrier for at least one manipulation element consisting of multiple sections. On its free end, this manipulation element carries a tool or a device that is ready for use after it has reached the respective station. The shielding effect of the housing reliably protects an operator side against accidents due to inadvertent interventions in machine motion sequences.

20 Claims, 7 Drawing Sheets

(56) References Cited

U.S. PATENT DOCUMENTS

2012/0111424 A1* 5/2012 Felgenhauer .......... C03B 9/165
                                                       137/343
2012/0261850 A1   10/2012 Simon

FOREIGN PATENT DOCUMENTS

| EP | 1591427 A1     | 2/2005  |
|----|----------------|---------|
| FR | 2901551 A1     | 11/2007 |
| WO | 2010/055251 A1 | 5/2010  |
| WO | 2010055251 A1  | 5/2010  |

* cited by examiner

DEVICE FOR MANUFACTURING HOLLOW GLASS ARTICLES

BACKGROUND

The invention pertains to a device for manufacturing hollow glass articles, such as an IS (Individual Section) machine.

Between the infeed of a molten glass gob and the ultimate delivery of a formed hollow glass article, a glass forming machine, particularly an IS machine, comprises multiple assemblies, mechanisms, measuring and handling systems that not only require monitoring, but also servicing that involves activities in the machine. For safety concerns, such activity is frequently impossible or at least extremely difficult while the machine is running. On the other hand, a machine standstill is highly undesirable for cost reasons alone and therefore should be minimized. It is known to carry out or at least support these activities with mechanized means.

Publication DE 5 785 727 B discloses a device for manufacturing picture tubes with a rotary table that carries a plurality of molds, in which the forming process is carried out on a gob of molten glass in cooperation with a ram that can be lowered into the molds from above in a forming station. A lubricating robot simplifies the separation of the glass body produced within from the inner walls of the mold and the outer walls of the ram. The lubricating robot is designed for applying a lubricant on these walls. The lubricating robot consists of a base body that is arranged at a location along the periphery of the rotary table in a height-adjustable fashion, as well as a guide element that consists of multiple sections and has six axes of motion coupled thereto, wherein the guide element is provided with a spray head on its free end and connected to a lubricant reservoir via a supply line. The spray head can be moved vertically into and out of the mold through the open upper side and is designed for spraying the lubricant on the aforementioned walls, which come in contact with the glass material during the forming process, in cooperation with a control. The molds to be lubricated are moved into the operating range of the lubricating robot in accordance with the rotation of the rotary table.

Publication EP 0 372 530 A1 discloses a device for applying lubricant on the inner surfaces of a mold used for manufacturing hollow glass articles, wherein the device is positioned above the mold, namely laterally offset to its axis. The device carries a guide element, the free end of which is provided with a spray head that can be moved between an active position, i.e. a position for spraying lubricant into the mold, and an inactive position. In this case, the lubricant consists of oil mixed with carbon particles and is sprayed into the mold in intervals through the open upper side in accordance with a predefined schedule. Each of the multiple molds of a glass forming machine may be equipped with such a device. As an alternative, this publication also mentions the use of a device that can be moved along the glass forming machine.

WO 2010/055251 A1 discloses a method for manufacturing hollow glass articles, in which a robot is arranged on a rail such that it can be displaced along the blank molds of an IS machine. The robot carries different devices and can be used for exchanging a blank mold, for lubricating the blank mold and for cleaning purposes. It can also be used for guiding measuring devices such as, e.g., a pyrometer or one or more cameras.

FR 2 901 551 A1 describes a method for automatically lubricating molds used for manufacturing hollow glass articles, wherein a robot carrying a lubricating tool can once again be moved along the row of adjacently arranged blank molds of an IS machine on a rail. The lubricating tool consists of a lance, on the free end of which quills are arranged, wherein the mold halves of the blank mold are in the closed state during the lubrication of its inner walls. The mold halves are transferred into the open state in order to lubricate the associated neck mold, wherein the lance always is inserted into the blank mold or into the intermediate space between the mold halves, respectively. The individual phases of the lubricating process are carried out in cooperation with a central control.

This prior art indicates that it is common practice to utilize movable robots in connection with glass forming machines to carry out different functions that are associated with the operation of the glass forming machine and involve much more than mere lubrication. The robot is designed for cooperating with the individual stations of the IS machine and accordingly can be displaced along the row of adjacently arranged blank molds. However, this forms a potential safety hazard because movable machine structures and an operator side are not sufficiently separated from one another. This not only concerns the motion of the robot along the blank mold side, but also the motions of tools, devices, etc., guided by the robot. Due to these circumstances, special safety measures are required in order to prevent potential accidents.

DE 60 2005 002 072 T2 discloses a processing station for panes of glass that consists of a table, above which a processing head is arranged such that it can be two-dimensionally displaced in the horizontal plane of the table. The table is furthermore provided with conveyor belts, which are dimensioned such that the loading of said conveyor belts with panes to be processed, as well as the unloading of processed panes from these conveyor belts, can in any case take place outside the operating range of the processing station such that occupational safety requirements are met.

SUMMARY

In light of these circumstances, the invention aims to design a device of the initially cited type in such a way that the protection of an operator side is enhanced and operational control and monitoring functions are simultaneously improved with simple means. In such a device, this objective is attained with the characteristics disclosed in the forgoing disclosure and claims.

According to the invention, it is therefore advantageous to provide a carrier system that is designed for guiding tools and devices and can be moved along the glass forming machine, wherein the carrier system includes a structure that is open toward a machine side only and otherwise closed. At least one manipulation element is arranged within this structure, wherein the free end of this manipulation element can be moved between an active and an inactive position and is designed for directly attaching the aforementioned tools and/or devices. Safety aspects are adequately taken into account with the closed design of the carrier system toward an operator side such that an operator is reliably prevented, in particular, from carrying out potentially hazardous activities in the region facing the glass forming machine, in which the tool or the device is also moved. The carrier system is suspended on a rail-like guide and can be displaced along this guide in a motor-driven fashion. The guide is advantageously fastened directly on the machine frame of the device at the required height. Depending on the type of activity, for which the respective tool or device is designed, this activity can also be carried out while the operation of the machine continues in otherwise unchanged form. In its inactive position, the free end of the manipulation element is advantageously retracted into the carrier system, wherein this preferably also applies to the tool or device to be moved such that no structures substantially protrude from the carrier system during its displacement along the device or the machine, respectively.

According to another aspect of the disclosure, the carrier system may be movable, for example, along a blank mold side of the glass forming machine. However, a motion along other machine sections is also conceivable.

Other aspects of the disclosure concern a constructive variation of the carrier system. Its walls may be closed or partially realized in the form of a screen as long as its main function of preventing an operator from carrying out activities on the machine side is ensured.

Additional aspects of the disclosure concern the design of the suspension of the carrier system on the aforementioned guide. However, alternative constructions in the form of linear guides, namely also variations that are supported on roller bearings, may likewise be used in this case.

Other aspects of the disclosure concern the design of the manipulation element used on the carrier system. This manipulation element is equipped with the number of joints necessary for transferring the tool or device to be guided to its point of use and for making available the required axes of motion at this point of use. A motor drive, which can be controlled with respect to its position and function, is assigned to each of these axes of motion. The carrier system may carry one, two or even more manipulation elements of this type and therefore also be equipped for complex servicing activities, measuring activities or the like.

In accordance with additional aspects of the disclosure, the manipulation element carries a spraying device and a gripper. In this way, the carrier system can be used for lubrication purposes and is therefore additionally connected to a lubricant reservoir. The specific design of the spraying device can vary and is adapted to the purpose of the lubrication, particularly to the properties of the machine element to be lubricated. A gripper at this location may be used, for example, for installing or removing machine elements or even complete assemblies and accordingly requires additional axes of motion and drives for its control. Depending on the complexity of the installation steps to be carried out, multiple manipulation elements, which are equipped with different tools or devices, may under certain circumstances also be used in this case. However, a person skilled in the art is familiar with these tools or devices such that a more detailed description in this respect is not required.

According to other aspects of the disclosure, the device attached to the free end of the manipulator element is a thermometer, particularly a radiation thermometer, such that surface temperatures can be measured in a contactless fashion. In this way, different locations of the device can be monitored by checking if the measured values of locally occurring temperatures lie within a tolerance range. This may concern the temperature of a glass gob to be formed, as well as the temperature of nearly all machine parts including the temperature of a lubricant.

In accordance with other aspects of the disclosure, the device held on the free end may consist of a camera. This provides extensive metrological and geometric options, for example, in the control of design parameters of the manufactured hollow glass articles, in the measurement of speeds and generally in the analysis of motion sequences.

According to another aspect of the disclosure, the device held on the free end of the manipulation element may also consist of an installation or handling device that can be used for changing machine adjustments. This may concern adjustments of nearly any type such as, for example, the adjustment of variables of molds, mechanisms, the gutter system, etc.

According to other aspects of the disclosure, all tools and devices carried by a manipulation element are connected to a machine control of the device such that their function can be centrally controlled. If corresponding data storage units are provided, this makes it possible to advantageously carry out control and servicing functions in an automated fashion according to a predefined time schedule.

BRIEF DESCRIPTION OF THE DRAWINGS

The invention is described in greater detail below with reference to the attached drawings. In these drawings.

DETAILED DESCRIPTION

Figure 1:
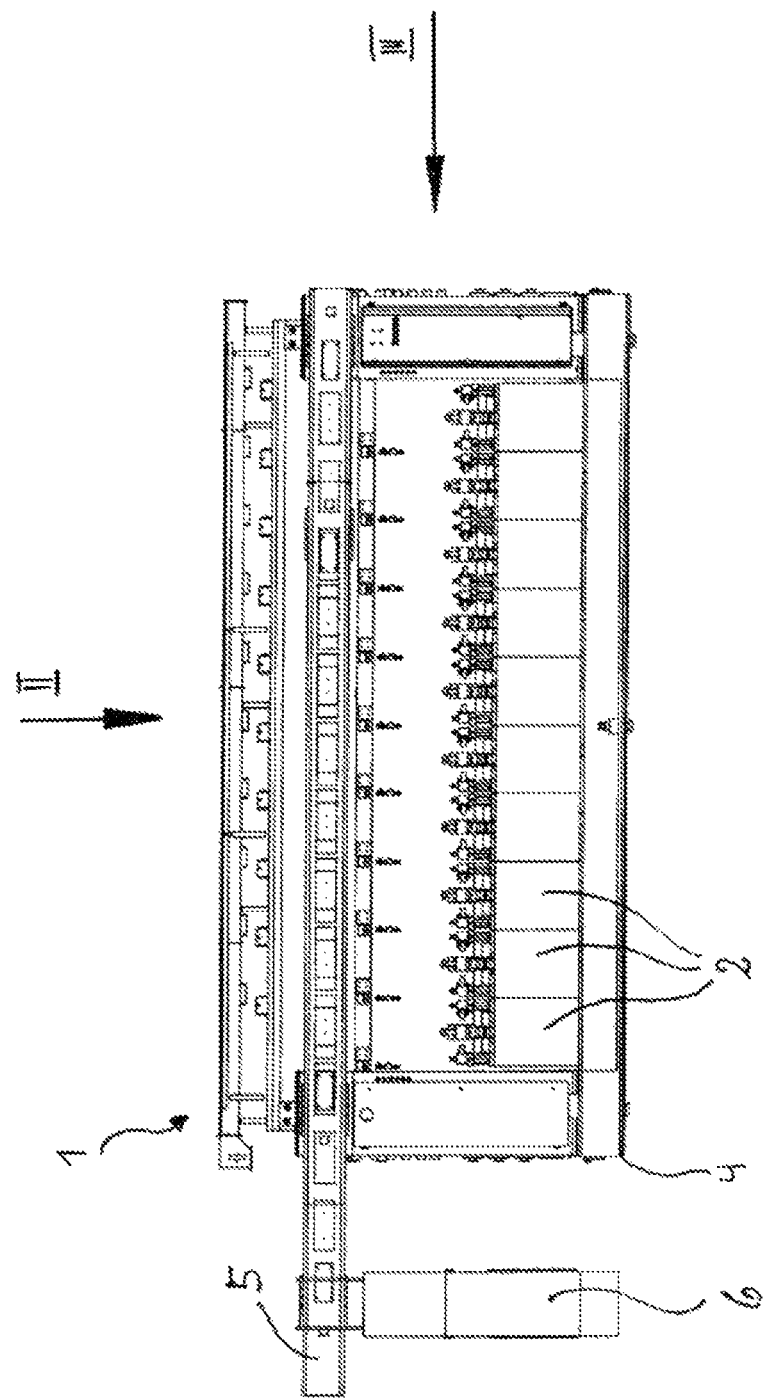
FIG. 1 shows a side view of the blank mold side of an IS machine.
Figure 2:
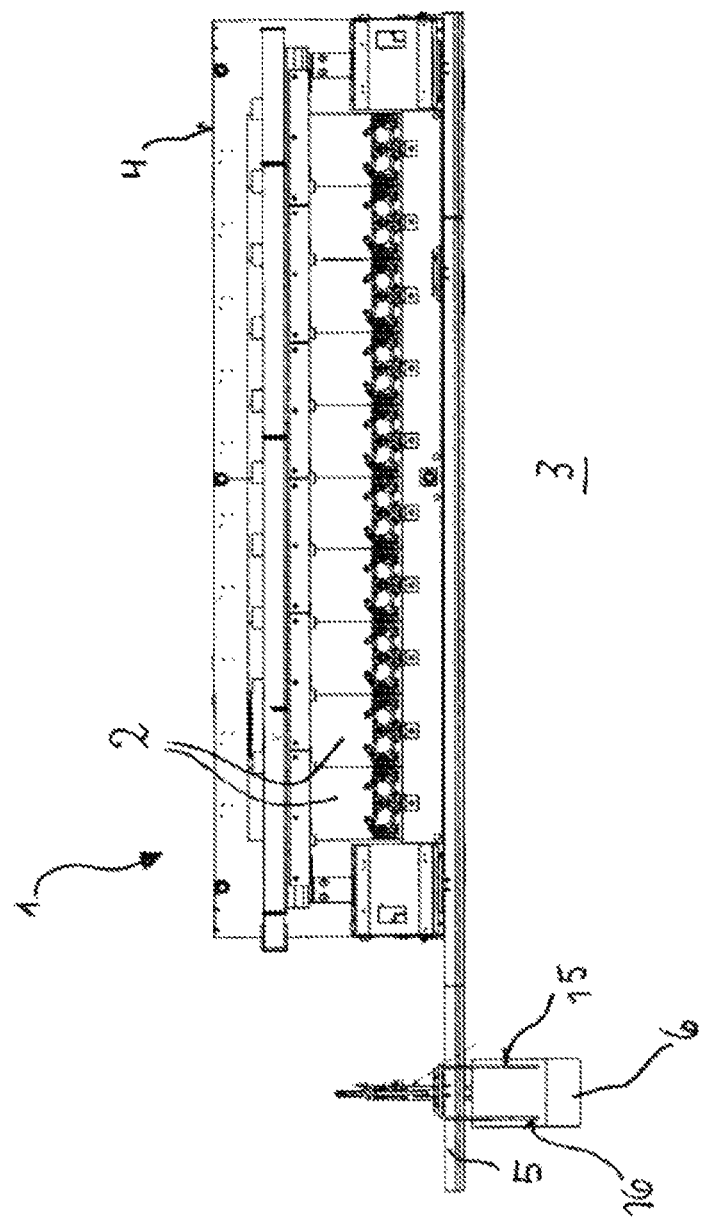
FIG. 2 shows a top view of the IS machine along the viewing direction II in FIG. 1.
Figure 3:
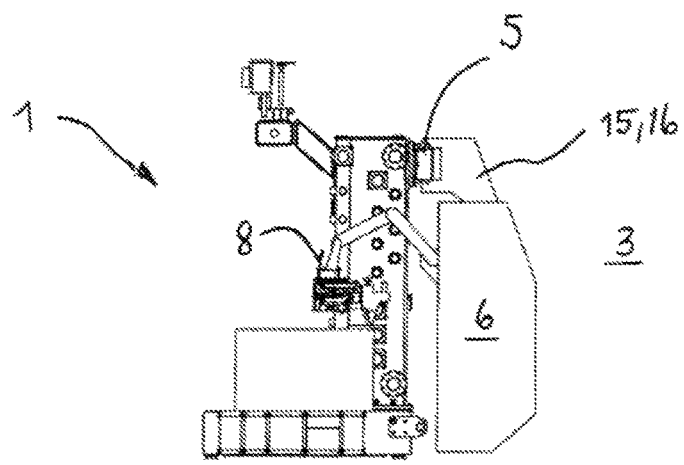
FIG. 3 shows a front view of the IS machine along the viewing direction III in FIG. 1.

In FIGS. 1-3, a glass forming machine is identified as a whole by the reference symbol 1, wherein this glass forming machine is characterized by an adjacent arrangement of numerous stations (individual sections) that have a modular design, and wherein multiple blank molds are accommodated, among other things, in these stations. FIG. 1 accordingly shows the blank mold side 3.

The stations are inserted into a machine frame 4 that stands on the floor, wherein a rail-like guide 5 horizontally extends along the blank mold side 3 of said machine frame. The guide 5 is rigidly connected to the machine frame.

A housing 6 can be displaced in the longitudinal direction of the guide 5 and positioned at defined locations in front of each of the stations 2, wherein said housing is open in the direction of the blank mold side 3 and otherwise closed. It may be partially realized in the form of a protective screen, but is in any case designed for forming a partition between an operator side and movable machine parts in the region of the glass forming machine. Drive elements for displacing the housing 6 along the guide 5 are not illustrated in order to provide a better overview.

The housing 6 is realized in the form of a movable carrier system for different tools and devices, wherein the following description in this respect additionally refers to the illustrations in FIGS. 4-11. It is essential that these devices and tools are held within the housing 6 and designed for carrying out certain functions in the station 2, in front of which the housing 6 is currently positioned. This means that a separation effect or protective effect for an operator side is also realized with respect to these devices and tools.

A manipulation element 7 with multiple joints is accommodated within the housing 6 and functionally connected to not-shown drives, which are respectively assigned to the different axes of motion, such that the free end 8 of each manipulation element 7 can move into any position within a defined operating range in cooperation with a likewise not-shown control, namely with an orientation that can also be controlled. The joints or axes of motion of the manipulation element 7 are designed such that the degrees of freedom required for the function of the carried tools and devices are realized.

Figure 4:
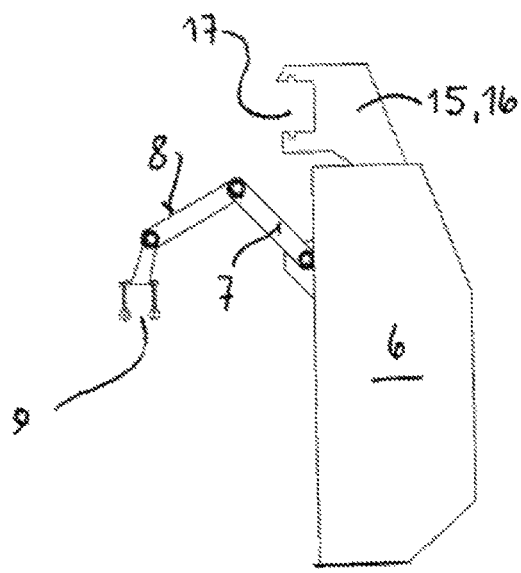
FIG. 4 shows an illustration of a first exemplary embodiment of a device or tool to be controlled.
Figure 5:
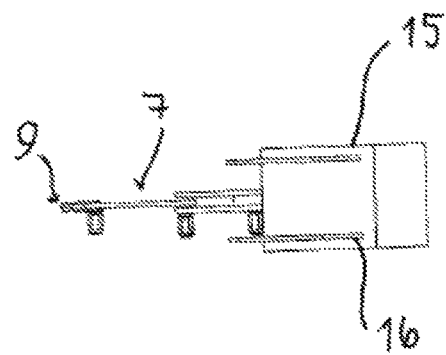
FIG. 5 shows a top view corresponding to the arrow V in FIG. 4.

According to FIGS. 4 and 5, the free end 8 carries a spraying device 9 such that the manipulation element 7 is designed for lubricating machine parts, e.g. a blank mold.

Figure 6:
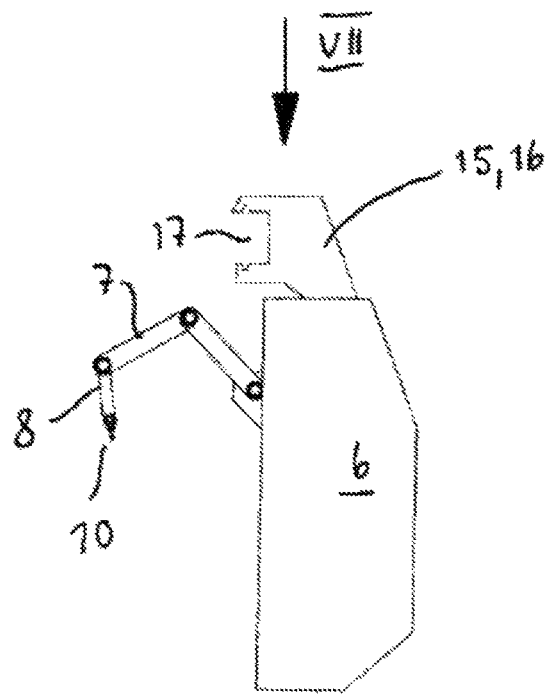
FIG. 6 shows an illustration of a second exemplary embodiment of a device or tool to be controlled.
Figure 7:
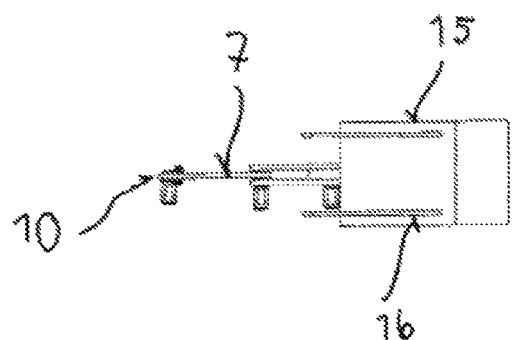
FIG. 7 shows a top view corresponding to the arrow VII in FIG. 6.

According to FIGS. 6 and 7, the free end 8 carries a gripper 10 such that the manipulation element 7 is designed for carrying out installation and removal functions.

Figure 8:
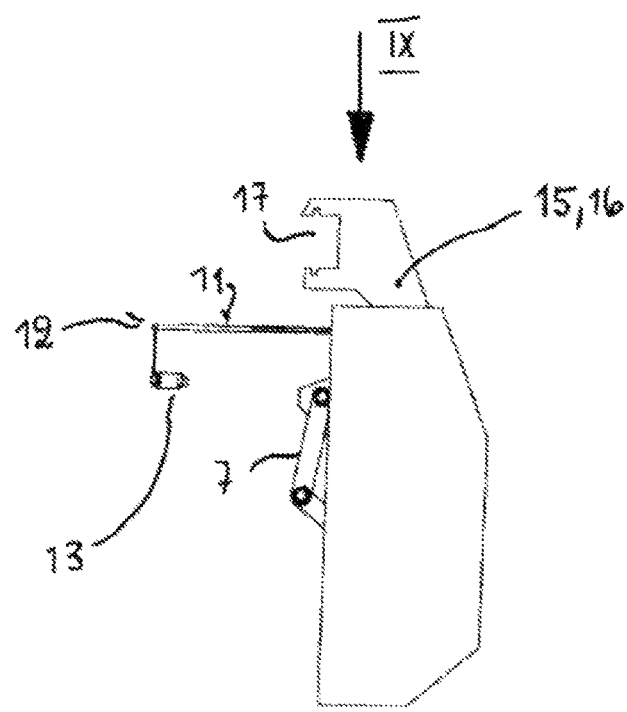
FIG. 8 shows an illustration of a third exemplary embodiment of a device or tool to be controlled.
Figure 9:
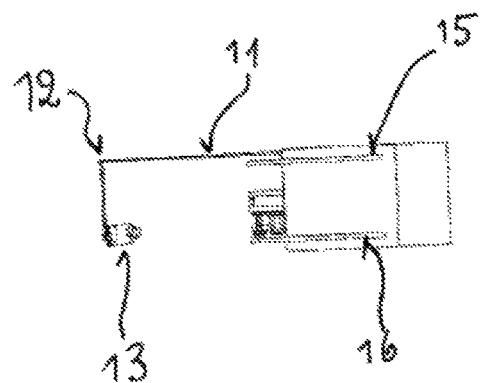
FIG. 9 shows a top view corresponding to the arrow IX in FIG. 8.

According to FIGS. 8 and 9, the housing 6 additionally carries another modified manipulation element 11, on the free end 12 of which a camera 13 is held. In this way, control functions can be carried out with the aid of industrial image processing means. It is essential that the manipulation element 11 can in this case also be arbitrarily positioned within a defined operating range in cooperation with the control such that an optical control can be realized from virtually any viewing angle.

Figure 10:
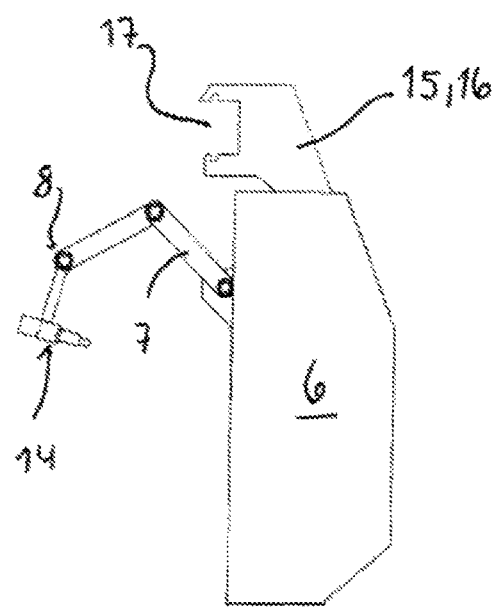
FIG. 10 shows an illustration of a fourth exemplary embodiment of a device or tool to be controlled.
Figure 11:
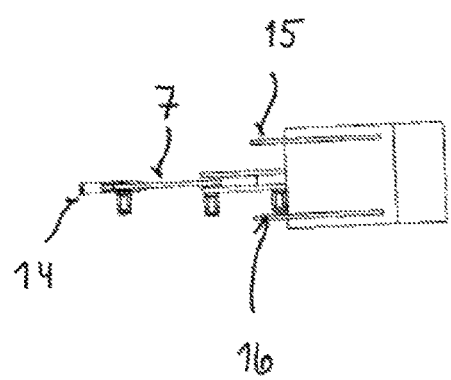
FIG. 11 shows a top view corresponding to the arrow XI in Figure 10.

According to FIGS. 10 and 11, the free end 8 carries a thermometer 14, e.g. an IR thermometer. This provides additional control options, particularly in the region of the molds, the glass material, etc.

Each manipulation element 7, 11 can be pivoted between an inactive position, in which it is at least for the most part retracted into the housing 6, and an active position, in which the tool or device located on the respective free end 8, 12 is in operational use.

The housing 6 has a globally key-like design that is open in the direction of the blank mold side 3 and on its upper side provided with two brackets 15, 16 that are laterally spaced apart from one another and feature a lateral recess 17 designed for engaging with the guide 5. Numerous modifications are possible, particularly with respect to the housing 6. For example, this housing may be equipped with more than two manipulation elements that, if necessary, carry different tools or devices, namely for the purpose of carrying out multiple control, measuring, servicing, installation and removal functions associated with the operation of the glass forming machine in a region that is largely shielded from an operator side.

LIST OF REFERENCE SYMBOLS

1. Glass forming machine
2. Station
3. Blank mold side
4. Machine frame
5. Guide
6. Housing
7. Manipulation element
8. End
9. Spraying device
10. Gripper
11. Manipulation element
12. End
13. Camera
14. Thermometer
15. Bracket
16. Bracket
17. Recess

The invention claimed is:

1. A device for manufacturing hollow glass articles, comprising:
   a machine frame, wherein the machine frame is configured to hold an arrangement of molds for carrying out a glass forming process; and
   a carrier system configured to be moved along the machine frame and stopped at defined positions along the machine frame, the carrier system comprising:
   a housing, wherein the housing is open in at least a direction facing toward the machine frame;
   an engagement bracket arrangement configured such that the housing is suspended on and movable along a rail guide of the machine frame; and
   at least one manipulation element arranged within the housing, wherein a free end of the at least one manipulation element is configured to guide at least one of a tool, a measuring element, a control device, and a servicing device, and further wherein the free end of the at least one manipulation element is configured to be movable between an active position, in which the at least one manipulation element faces a point of use on or within the machine frame, and an inactive position, in which the at least one manipulation element is retracted into the housing of the carrier system.

2. The device according to claim 1, wherein the carrier system can be moved along a blank mold side of the device.

3. The device according to claim 2, wherein the housing comprises a plurality of walls, and wherein at least one of the walls is closed.

4. The device according to claim 2, wherein the housing comprises a plurality of walls, and wherein at least one of the walls is at least partially configured as a screen-type wall.

5. The device according to claim 2, wherein the at least one manipulation element has multiple joints.

6. The device according to claim 2, wherein the at least one manipulation element carries at least one tool or device.

7. The device according to claim 2, wherein the at least one tool is a spraying device for discharging a lubricant.

8. The device according to claim 2, wherein the at least one tool is a gripper configured for taking hold of and handling machine elements.

9. The device according to claim 1, wherein the housing comprises a plurality of walls, and wherein at least one of the walls is closed.

10. The device according to claim 1, wherein the housing comprises a plurality of walls, and wherein at least one of the walls is at least partially configured as a screen-type wall.

11. The device according to claim 10, wherein the engagement bracket arrangement is provided with two brackets that are spaced apart from one another and designed for engaging with the guide.

12. The device according to claim 1, wherein the engagement bracket arrangement is provided with two brackets that are spaced apart from one another and designed for engaging with the guide.

13. The device according to claim 1, wherein the at least one manipulation element has multiple joints.

14. The device according to claim 1, wherein the at least one manipulation element carries at least one tool or device.

15. The device according to claim 14, wherein the at least one tool is a spraying device for discharging a lubricant.

16. The device according to claim 14, wherein the at least one tool is a gripper configured for taking hold of and handling machine elements.

17. The device according to claim 1, the measuring element is a thermometer.

18. The device according to claim 1, wherein at least one of the control device and the servicing device comprises a camera configured for measuring and monitoring purposes.

19. The device according to claim 1, wherein the servicing device is one of an installation or handling device for carrying out machine adjustments.

20. The device according to claim 1, wherein the at least one tool, measuring element, control device, or servicing device carried on the free end of the at least one manipulation element is functionally connected to a machine control.

* * * * *